United States Patent Office 3,770,797
Patented Nov. 6, 1973

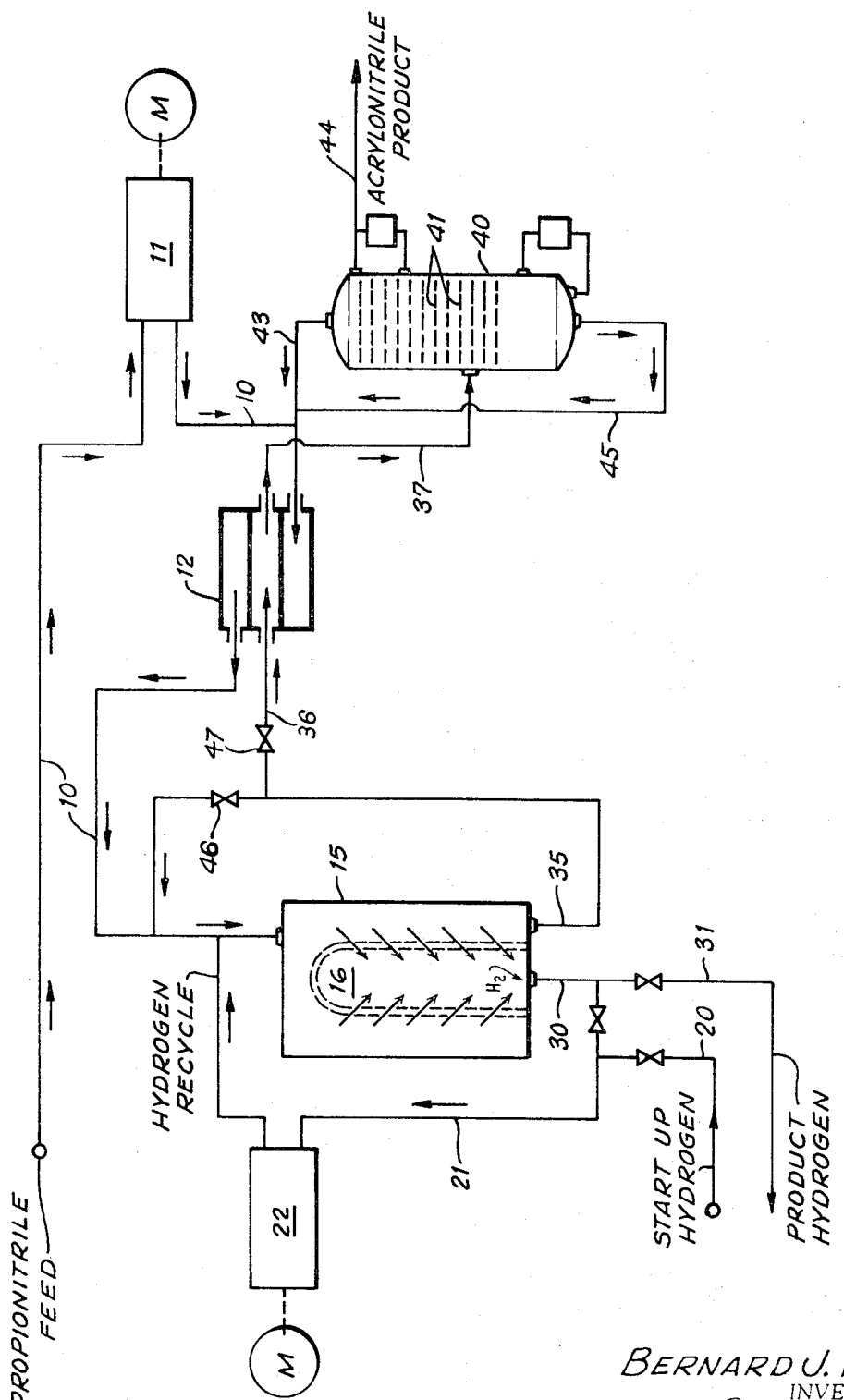

3,770,797
CATALYTIC CONVERSION OF ALKANONITRILES AND ALKENONITRILES TO A PRESELECTED ALKENONITRILE ISOMER
Bernard J. Wood, Santa Clara, Calif., assignor to Stamford Research Institute, Menlo Park, Calif.
Filed Apr. 12, 1971, Ser. No. 133,045
Int. Cl. C07c 121/02, 121/32
U.S. Cl. 260—465.9                   2 Claims

ABSTRACT OF THE DISCLOSURE

A process for the catalytic conversion of $C_3$ and higher alkanonitriles and $C_4$ and higher alkenonitriles to a preselected alkenonitrile isomer of the same carbon skeletal structure as the feed nitrile, the process comprising passing a vaporous mixture of said feed and hydrogen at elevated temperatures through a reaction zone over a palladium catalyst while maintaining the hydrogen content of said vaporous mixture at a relatively constant level as it passes through the reaction zone, the catalyst having been pretreated by exposure to the desired alkenonitrile isomer at elevated temperatures in the presence of hydrogen to adsorb said isomer on the catalyst surfaces. Specifically, acrylonitrile is produced from propionitrile.

SUMMARY OF THE INVENTION

It has been discovered that $C_3$ and higher alkanonitrile feeds, as well as $C_4$ and higher alkenonitrile feeds, can be converted by dehydrogenation or isomerization to any desired alkenonitrile isomer having the same carbon skeletal structure as the feed by passing a vaporous mixture of the feed compound and hydrogen, at elevated temperatures, over a palladium catalyst on which the said alkenonitrile isomer has been adsorbed by pretreatment, while maintaining the hydrogen content of the gases passing over the catalyst at a relatively constant level. Thus, when using an alkanonitrile the process is one of dehydrogenation, and hydrogen is withdrawn from the reaction zone at essentially the same rate as it is released by dehydrogenation. On the other hand, when using an alkenonitrile where the process is one of isomerization, care is taken to prevent undue loss of hydrogen from the reaction zone by diffusion through the catalyst or otherwise.

The pretreatment of the catalyst, whereby the desired alkenonitrile isomer product becomes adsorbed thereon, is carried out by exposing the heated catalyst, in a clean condition, to vapors of the said isomer product in the presence of hydrogen.

Any one of a wide variety of straight or branched chain alkanonitriles containing at least 3 carbon atoms, and preferably from about 3 to 10 carbon atoms, can be employed as the feed stock to be dehydrogenated to the desired alkenonitrile product of the same carbon skeletal structure. Thus, acrylonitrile can be produced from propionitrile; trans-2-butenonitrile, cis-2-butenonitrile and 3-butenonitrile can be produced from n-butyronitrile; methacrylonitrile can be produced from isobutyronitrile; 1-pentenonitrile or cis- or trans-2-pentenonitrile can be produced from n-pentanonitrile, and 2-methyl-1-butenonitrile can be produced from isopentanonitrile. Similarly, preselected $C_6$ alkenonitrile isomers of the same carbon skeletal structure can be produced from n-hexanonitrile, 2-methylpentanonitrile, 3-methylpentanonitrile, 2,2-dimethylbutanonitrile and 2,3-dimethylbutanonitrile, and $C_7$ alkenonitriles can be produced from n-heptanonitrile, 2 - methylhexanonitrile, 3-methylhexanonitrile, 2,2-dimethylpentanonitrile, 2,3-dimethylpentanonitrile, 2,4-dimethylpentanonitrile, 3,3-dimethylpentanonitrile, 3-ethylpentanonitrile and 2,2,3-trimethylbutanonitrile. Other preselected alkenonitrile isomers of the same carbon skeletal structure can be produced from the various straight and branched chain octanonitriles, nonanonitriles, decanonitriles, undecanonitriles, dodecanonitriles, tridecanonitriles, tetradecanonitriles, pentadecanonitriles, hexadecanonitriles, heptadecanonitriles, octadecanonitriles, nonadecanonitriles and eicosanonitriles, for example.

When using an alkenonitrile feed stock in the process hereof, there can be employed any one or more isomers of the same carbon skeletal structure as the alkenonitrile isomer to be formed by isomerization. Thus, 3-butenonitrile can be formed from trans-2-butenonitrile or cis-2-butenonitrile, or from a mixture of the said cis- and trans-isomers. Similarly, cis-2-butenonitrile can be formed from 1-butenonitrile and/or trans-2-butenonitrile. On the other hand, methacrylonitrile, with its particular carbon skeletal structure, cannot be converted to any other butenonitrile isomer. Other alkenonitrile isomers such, for example, as those mentioned or referred to in the preceding paragraph, can also be employed as feeds.

It also forms a feature of this invention to employ mixtures containing both an alkanonitrile and one or more alkenonitrile isomers, all of the same carbon skeletal structure, as the feed to the pretreated catalyst, along with hydrogen. All the several feed components are converted in some measure to the preselected alkenonitrile isomer which has been laid down on the catalyst surface in the pretreatment step.

The term "palladium", as employed herein to describe the catalyst employed in carrying out the process of the present invention, includes those wherein the catalyst is made up of pure palladium or a palladium alloy containing more than about 40 atom percent of palladium, as taught in the art. Thus, the palladium can be alloyed with silver, gold or platinum, with still other metals being added on occasion to add strength or for other purposes. The catalyst can take unsupported metal form, and for this purpose there is commonly employed an alloy of palladium with about 25 atom percent of silver. Unsupported palladium metal catalysts of this character have the capacity to take up hydrogen readily, such hydrogen diffusing rapidly and selectively through the metal.

In carrying out the pretreatment of the palladium catalyst, whereby the desired alkenonitrile isomer becomes adsorbed on the catalyst surface in the nature of a template, the catalyst is first placed in a "clean" condition. This can be accomplished, for example, by heating the catalyst in vacuum at 350° C. to 450° C. for one or more hours, with the hot catalyst then being exposed to air at ambient pressures for a few minutes to remove any residual organic materials which may be present. Following this, the system can be evacuated and it is ready for the pretreatment with the alkenonitrile product compound. This can be accomplished by exposing the catalyst surfaces to vapors of said product compound in the presence of hydrogen. The treatment is carried out at elevated catalyst temperatures high enough to induce the formation of the desired alkenonitrile template on the exposed catalyst surfaces. Such temperatures can range from about 100° C., or even somewhat lower, up to such higher temperatures as from about 250° to 400° C., or more. The desired result can be obtained by allowing the heated catalyst surface to come into contact first with the hydrogen and then with the alkenonitrile, or with a mixture of the alkenonitrile and hydrogen. In another method, one surface of a metallic palladium catalyst (which is later to be exposed to the feed stock) can first be treated with the alkenonitrile at appropriate temperatures, as noted above, with hydrogen thereafter being supplied to said surface by diffusion through the metal as the other surface of the catalyst is exposed to hydrogen gases. All these treatments can be conducted at ambient, subatmospheric or superatmospheric pressures.

The foregoing catalyst pretreatment step can be accomplished within a few seconds, if desired, though preferably it is carried out over a period of several minutes. Thus, in a typical operation the clean catalyst at 330° C. is first exposed for several minutes to hydrogen at 300 to 500 mm. Hg, following which the alkenonitrile is brought into the hydrogen environment at partial pressures of about 5 to 100 mm. Hg. The system is then again allowed to stand for several minutes that it may come to equilibrium, at which point the pretreatment is complete.

Following the catalyst pretreating step, the alkanonitrile or alkenonitrile feed is passed in the vapor phase, along with hydrogen, over the catalyst which is maintained at temperatures within a range of from about 90° to 450° C. Within these limits, the temperatures employed should be high enough to maintain the feed compound in the gaseous state, and not so high as to induce significant decomposition of the feed or of the product gases in the reaction zone. Activity of the catalyst increases with temperature, and for any given system routine trials should be made at various temperatures to ascertain the optimum temperatures to be employed.

As noted above, the alkanonitrile and/or alkenonitrile gases employed as feed are always supplied to the heated, pretreated catalyst along with hydrogen, the proportions of reactant and hydrogen being such that the conditions which are required for dehydrogenation or isomerization are maintained over the catalyst. More specifically, when using an alkanonitrile feed there is preferably supplied to the reaction zone a mixture containing at least 0.5 mole of hydrogen per mole of alkanonitrile, and the optimum proportion of hydrogen may well be from 1 to 10 or more moles, per mole of the alkanonitrile, depending on the thermodynamics of a particular system. When using an alkenonitrile (to be isomerized) as the feed, there should be employed not more than about 1 mole, and preferably from about 0.2 to 0.4 mole, of hydrogen per mole of the alkenonitrile. In all cases, the optimum hydrogen/hydrocarbon mole ratio can routinely by determined by one skilled in the art.

The rate at which the mixed hydrogen and feed gases are supplied over the catalyst in the reaction zone is not critical inasmuch as some reaction will take place even when the throughput rate is set at a high level. Similarly, the use of a low or even static feed rate, wherein the alkanonitrile or alkenonitrile feed material has a relatively long residence time over the catalyst, is not harmful inasmuch as side reactions and those of product decomposition are essentially absent in the present system. In most operations it has been found that good results can be obtained by the use of residence times in the reaction zone of from about 0.05 second to 1 or more minutes. These times assume that the geometry of the reactor is such that the entrant feed gases are efficiently brought into contact with the pretreated palladium catalyst surfaces in the reaction zone.

The feed gases can be passed over the catalyst under ambient, subatmospheric or superatmospheric conditions of pressure. The use of moderately elevated pressures is generally preferred, particularly when using an alkanonitrile feed and a catalyst of the metallic type through which hydrogen is withdrawn from the reaction zone to maintain the partial pressure of hydrogen therein at a relatively constant level.

In those reactions involving dehydrogenation of an alkanonitrile to the alkenonitrile product, it is necessary that hydrogen be removed from the reaction zone at a rate which corresponds to that at which hydrogen is released at the catalyst surfaces as dehydrogenation occurs. When the catalyst employed is one of the metallic palladium type, the reactor may be so set up that the reactants are brought into contact with one surface of the catalyst at elevated pressures (e.g. 50 to 250 p.s.i.g.), while the area adjacent the other surface of the catalyst is maintained at somewhat lower pressures. In other words, there should be established a substantial pressure drop from one side of the catalyst to the other. For example, when using a tubular catalyst, the latter can be positioned within a reaction zone in such a way that feed gases passing through the reaction zone contact only the outer surfaces of the catalyst tube. With the aid of a pressure differential, pure hydrogen can then be withdrawn by diffusion through the tube wall from the reaction zone into the interior of the tube for transport out of the reactor. Other catalyst-reactor configurations will suggest themselves to those skilled in the art.

When the feed is an alkenonitrile to be isomerized, there is no net production of hydrogen. Consequently, care must be taken to make sure that no significant portion of the hydrogen introduced with the feed is lost as the feed gases pass over the catalyst and out the reaction zone. Thus, if the reaction is conducted over a hydrogen-porous metallic catalyst, the reaction conditions should be such that there is little, if any, pressure drop across the catalyst wall.

In carrying out the process of the present invention, it is possible to effect a substantial per-pass conversion of the alkanonitrile or alkenonitrile feed to the desired alkenonitrile isomer as the feed stream is continuously passed over the catalyst. The resulting product stream which is discharged from the reactor can then be worked up so as to recover the alkenonitrile product and to recycle the unconverted feed gases, along with necessary hydrogen, to the reactor. In another method of operation, a portion of the reactor effluent may be continuously sent to product recovery, while the balance thereof is recycled to the reactor along with added quantities of the fresh feed gases. In alkanonitrile dehydrogenation operations wherein a metallic palladium catalyst is employed, with hydrogen being withdrawn from the feed gases by diffusion through the catalyst, the net production of hydrogen can be recovered from the system as valuable product.

To illustrate a typical recycle method of practicing the invention, there is presented in the figure of the accompanying drawing a schematic flow diagram of a unit for converting propionitrile to acrylonitrile. In this diagram, preheated propionitrile is shown as entering the system through a feed line 10 where it passes through a compressor 11 and then through a heat exchanger 12 before being discharged under superatmospheric pressures into reactor 15. In the reactor the propionitrile passing through the reaction zone comes into contact with the outer surface (appropriately pretreated with acrylonitrile) of a metallic palladium-silver alloy catalyst having the form of a hollow tube 16, closed at its upper end. As the unit is started up, hydrogen is supplied to the unit through lines 20 and 21, the gases in the latter line being passed through a compressor 22 before entering line 10 for introduction into the reactor 15 along with the propionitrile.

Once the reaction is under way, line 20 can be closed off, for the system has a net production of hydrogen and the amount of this gas required in the feed stream can be supplied by way of recycle.

The mixed propionitrile and hydrogen gases in reactor 15 are exposed to the outer surface of the catalyst tube 16 which is maintained at the desired elevated temperatures either by the incoming heated gases, or by an external heater (not shown), or both. A substantial pressure differential is maintained across the catalyst; i.e., the pressures exteriorly of tube 16 are greater than those which prevail within the interior of the tube which is in communication with a hydrogen exit line 30. Due to this pressure differential, hydrogen gases at the outer surface of the tube 16 rapidly diffuse through the catalyst wall and into the interior of the tube for passage out of the reactor through line 30. That portion of the exiting hydrogen gases which represents net hydrogen production is discharged through the line 31, while the balance is recycled via line 21 to the reaction zone.

Gases are discharged from the reaction zone through line 35. A portion of said gas is taken to product recovery through line 36, while the balance is recycled through the reaction zone. The product gases in line 36 pass through heat exchanger 12, where they bring the propionitrile in line 10 to a predetermined temperature. The product gases then pass through line 37 into a distillation column 40. In said column, which is provided with trays 41 of the desired type and number, the hydrogen is taken off at the top of the column through line 43 for return to the reactor through line 10. The acrylonitrile is recovered as a sidestream through line 44, while the unconverted propionitrile is removed as a bottom stream and is recycled to the reactor through lines 45 and 10.

Should it not be desired to recycle a substantial volume of the gases in line 35 to the reactor, valves 46 and 47 can be so adjusted as to direct the entire product stream to column 40.

In connection with the above description of the diagram, it should be recognized that the outer surface of the catalyst tube 16 has been subjected to an appropriate pretreatment with acrylonitrile and hydrogen. Mention may also be made of the fact that a palladium-silver (25%) alloy catalyst tube having a wall thickness of 0.003 inch has the ability to transfer through the wall 1 s.c.f. $H_2$/hr. for each 0.63 sq. in. of catalyst surface at a pressure differential of 200 p.s.i.g. and a temperature of 800° F.

The following examples merely illustrate the invention and are not to be construed as limiting:

EXAMPLE 1

In this operation, propionitrile is converted to acrylonitrile in a tubular glass vessel, or reactor tube, provided with a palladium-silver (25%) metallic catalyst. The latter is in the form of a hollow cylinder closed at one end, and having a diameter of ⅜ inch, a wall (or membrane) thickness of 0.01 inch, and a surface area of about 25 square centimeters. The particular apparatus employed is similar to that shown in FIG. 1 of the article, "Dehydrogenation of Cyclohexane on a Hydrogen-Porous Membrane," Journal of Catalysis, 11, 30–34 (1968).

To provide a clean catalyst for pretreatment, the reactor is heated to a temperature of 400° C. for several hours under vacuum. At the end of this period, the system, still at 400° C., is opened to the atmosphere for several minutes in order to burn off any organic components which may still be present on the catalyst. The glass tube and the tubular catalyst membrane are then evacuated to a pressure of less than 1 mm. Hg, following which the reactor and the membrane are closed off from the vacuum pump. The temperature is now reduced to 100° C. and the outer surface of the clean, tubular catalyst is exposed to acrylonitrile at 80 mm. Hg in the absence of hydrogen. After several minutes, hydrogen is admitted to the interior of the tubular catalyst at atmospheric pressure, the temperature still being maintained at 100° C. The hydrogen so admitted diffuses through the wall of the catalyst to the exterior surface thereof, where it converts the acrylonitrile to propionitrile. The pressure of the latter during this hydrogenation period rises to 80 mm. Hg while that of acrylonitrile drops to substantially zero. The hydrogen pressure which develops exteriorly of the tubular catalyst during this period is 550 mm. Hg. Essentially all of the hydrogen is now withdrawn from the system by connecting a vacuum line to the interior of the catalyst tube, the temperature of the latter being maintained at 100° C. At the end of this hydrogen-withdrawal period, which extends over an interval of 150 minutes, it is found that the following partial pressures prevail in the reaction zone over the catalyst: acrylonitrile 41 mm. Hg, propionitrile 39 mm. Hg, and hydrogen substantially 0 mm. Hg.

This represents a conversion of propionitrile to acrylonitrile in excess of 50 percent. No other products are detected over the catalyst. During the course of this run, product analyses are made by gas chromatography on aliquots taken from the reactor with a syringe.

EXAMPLE 2

In a manner essentially the same as that set forth above in Example 1, but using catalyst pretreatment and dehydrogenation temperatures of approximately 150° C. rather than 100° C., the catalyst is pretreated with methacrylonitrile and isobutyronitrile is dehydrogenated to methacrylonitrile in yields exceeding 50 percent.

Alkenonitrile compounds produced by the method of this invention can be recovered by conventional distillation or other separation methods known to the skilled in the art. These product compounds are well known organic chemicals which have a wide variety of uses as solvents and the like. They are useful in many cases as polymerizing ingredients of various polymer products.

The process of this invention, as noted above, can be employed to dehydrogenate propionitrile to acrylonitrile. Propionitrile, in turn, can readily be prepared in accordance with known methods such as that described in U.S. Pat. No. 3,282,981, to Davis, issued Nov. 1, 1966. In many such methods of preparation, ethylene is catalytically added to hydrogen cyanide, the recited patent disclosing the use of hydrogen in the feed stream to the reactor. Such processes generate a product gas stream which contains propionitrile and unreacted ethylene and hydrogen cyanide, optionally along with hydrogen and a carrier gas such as methane. Such product streams, when combined with any added hydrogen required, can be used as the feed stream in carrying out the process of this invention. The propionitrile present will be converted to acrylonitrile, and the product stream can then be worked up so as to recover this product while recycling the residual gases in the desired fashion to the respective propionitrile-forming and acrylonitrile-forming reactor units.

What is claimed is:

1. A process for the conversion of propionitrile to acrylonitrile which comprises passing a vaporous mixture of propionitrile and hydrogen, substantially free of oxygen and containing from about 0.5 to 10 moles of hydrogen per mole of propionitrile, at temperatures of from about 90° C. to about 450° C. through a reaction zone over a catalyst having the capacity to take up hydrogen and consisting of palladium or a palladium alloy containing at least 40 atom percent of palladium, while maintaining the hydrogen content of said mixture at a relatively constant level as it passes through the reaction zone, said catalyst having been pretreated, when free of organic materials, with acrylonitrile in the presence of hydrogen at temperatures high enough to induce the acrylonitrile to be adsorbed on the catalyst surface.

2. A process for the conversion of isobutyronitrile to methacrylonitrile which comprises passing a vaporous mixture of isobutyronitrile and hydrogen, substantially free of oxygen and containing from about 0.5 to 10 moles of hydrogen per mole of isobutyronitrile, at temperatures of from about 90° C. to about 450° C. through a reaction zone over a catalyst having the capacity to take up hydrogen and consisting of palladium or a palladium alloy containing at least 40 atom percent of palladium, while maintaining the hydrogen content of said mixture at a relatively constant level as it passes through the reaction zone, said catalyst having been pretreated, when free of organic materials, with methacrylonitrile in the presence of hydrogen at temperatures high enough to induce the methacrylonitrile to be adsorbed on the catalyst surface.

References Cited
UNITED STATES PATENTS

| | | | |
|---|---|---|---|
| 2,701,260 | 2/1955 | Hagemeyer, Jr. | 260—465.9 |
| 2,734,909 | 2/1956 | Gee, Jr., et al. | 260—465.9 |
| 3,542,847 | 11/1970 | Drinkard, Jr., et al. | 260—465.9 |

JOSEPH P. BRUST, Primary Examiner